(12) United States Patent
Lee et al.

(10) Patent No.: US 6,540,953 B1
(45) Date of Patent: Apr. 1, 2003

(54) MICROPOROUS MEMBRANE AND METHOD FOR PROVIDING THE SAME

(75) Inventors: Sang-Young Lee, Taejeon (KR); Myung-Man Kim, Taejeon (KR); Heon-Sik Song, Taejeon (KR)

(73) Assignee: LG Chemical Ltd., Seoul (KR)

( * ) Notice: Subject to any disclaimer, the term of this patent is extended or adjusted under 35 U.S.C. 154(b) by 0 days.

(21) Appl. No.: 09/554,625

(22) PCT Filed: Nov. 16, 1998

(86) PCT No.: PCT/KR98/00365

§ 371 (c)(1),
(2), (4) Date: May 17, 2000

(87) PCT Pub. No.: WO99/25464

PCT Pub. Date: May 27, 1999

(30) Foreign Application Priority Data

Nov. 17, 1997 (KR) .............................. 97-60661

(51) Int. Cl.$^7$ .................. B01D 67/00; B01D 69/00; B01D 71/26; B29C 35/10; B29C 67/20
(52) U.S. Cl. .................. 264/413; 264/83; 264/210.3; 264/210.4; 264/210.5; 264/210.7; 264/211.18; 264/211.2; 264/235; 264/235.6; 264/470; 264/473
(58) Field of Search ................ 264/83, 210.3, 264/210.4, 210.5, 210.7, 211.18, 211.2, 235, 235.6, 413, 470, 473

(56) References Cited

U.S. PATENT DOCUMENTS

| | | |
|---|---|---|
| 3,231,530 A | 1/1966 | Prahl |
| 3,471,597 A | 10/1969 | Schirmer |
| 3,679,538 A | 7/1972 | Druin et al. |
| 3,801,692 A | 4/1974 | Zimmerman |
| 3,843,761 A | 10/1974 | Bierenbaum et al. |
| 3,853,601 A | 12/1974 | Taskier |
| 3,880,966 A | 4/1975 | Zimmerman et al. |
| 3,951,815 A | 4/1976 | Wrasidlo |
| 4,039,440 A | 8/1977 | Cadotte |
| 4,238,459 A | 12/1980 | Phillips, Jr. et al. |
| 4,340,482 A | 7/1982 | Sternberg |
| 4,346,142 A | 8/1982 | Lazear |
| 4,357,364 A | 11/1982 | Jones |
| 4,459,937 A | 7/1984 | Jones |
| 4,502,931 A | 3/1985 | Asano et al. |
| 5,013,439 A | 5/1991 | Fisher et al. |
| 5,085,775 A | 2/1992 | Swamikannu |
| 5,294,346 A | 3/1994 | Donato et al. |
| 6,162,843 A * | 12/2000 | Fisher et al. ................ 522/125 |

FOREIGN PATENT DOCUMENTS

JP            831399            2/1996

OTHER PUBLICATIONS

Database WPIL on Questel, week 9824, London: Derwent Publications, Ltd., AN 98–270046, RU 2093254 C1 (Laser OPT Information Systems Res. Inst.), abstract. (Published Oct. 20, 1997).

* cited by examiner

Primary Examiner—Leo B. Tentoni
(74) Attorney, Agent, or Firm—Baker Botts L.L.P.

(57) ABSTRACT

A method of producing a microporous membrane comprising the steps of: extruding a polymer at a temperature of from (polymer melting point +10° C.) to (polymer melting point +100° C.); drawing the extruded polymer at a rate of 5~120 m/min in 10~150° C. to obtain a polymer film; annealing the polymer film at a temperature of from (polymer melting point −100° C.) to (polymer melting point −5° C.) for 10 seconds to 1 hour; irradiating both surfaces of the annealed polymer film with an ion-particle amount of $10^2$~$10^{20}$ ion/cm$^2$ energized at $10^{-2}$~$10^7$ KeV, at an irradiating distance of 5~100 cm under a vacuum of $10^{-2}$~$10^-$ [torr; cold stretching the irradiated polymer film at a temperature of from −20° C. to (polymer melting point −40° C.); hot stretching the cold stretched polymer film at a temperature of from (polymer melting point −40° C.) to (polymer melting point −5° C.); and heat setting the hot stretched polymer film at a temperature of from (polymer melting point −80° C.) to (polymer melting point −5° C.).

24 Claims, No Drawings

MICROPOROUS MEMBRANE AND METHOD FOR PROVIDING THE SAME

CROSS-REFERENCE TO RELATED APPLICATIONS

This application is a national phase application of International Application No. PCT/KR98/00365, which was filed on Nov. 16, 1998 and which published in English on May 27, 1999, which in turn claims priority from Korean Application No. KR 1997/60661, which was filed on Nov. 17, 1997.

BACKGROUND OF THE INVENTION (a) Field of the Invention

The present invention relates to a microporous membrane and a method for providing the same, and more particularly to a method for providing a microporous membrane having hydrophilic/hydrophobic properties and pores with uniform size and shape by irradiating energized ion particles to a polymer film under vacuum.

(b) Description of the Related Art

Currently, there are various types of microporous membranes being used as a separator in lithium battery. Conventional methods for producing these microporous membranes are classified into a wet method and dry method. These methods utilize fillers or wax with a solvent as in wet method, or without the solvent as in dry method, to produce a precursor film. Then a resulting microporous membrane is obtained by forming micro-pores in the precursor film.

There are numerous methods of forming micro-pores, such as in cold and hot stretching methods the precursor film is subjected to a stretching process, and in an extraction method low molecular weight particles are extracted from the precursor film which has been subjected to a biaxial stretching (alternatively, biaxial stretching process can be implemented after the extraction method) to form micro-pores on the precursor film. Further, the precursor film can be subjected to a corona discharge method followed by a stretching, or it can be etched after being irradiated with high-energy ion-beams as in a track-etching method to obtain microporous membrane. The method utilizing cold or hot stretching process is referred to as a dry process. U.S. Pat. Nos. 3,679,538;1 3,801,692 3,843,761; 4,238,459; and 5,013,439 disclose the dry process, while U.S. Pat. Nos. 3,471,597 and 3,880,966 disclose corona discharge process for obtaining a precursor film with pores.

The dry process has an advantage in that it does not utilize environmental hazardous solvents, and hence the method is referred to as a clean process and is widely used in the industry. However, microporous membranes produced by the dry process have pores with undesirable small sizes, and presents the difficulties of adjusting and increasing shape and size of the pores. Further, there is a drawback in that during stretching, maintaining shape of the pores becomes difficult as stretch ratio increases.

The conventional methods for producing microporous mebranes to be used as a separator in lithium battery utilize polyolefin resin because of its cost and chemical and physical property. However, due to the hydrophobicity of the polyolefin resin, there is a low wettability of electrolytes for the separator. Currently, there are numerous researches being carried out to incorporate hydrophilic property to polyolefin resin membranes. The method described by Hoechst Celenese processes the surface of the polyolefin resin membrane with surfactants, and other methods described by U.S. Pat. Nos. 3,231,530; 3,853,601; 3,951,815; 4,039,440; and 4,340,482 integrates monomers having high hydrophillic property or processes the polyolefin resin membranes with chemicals. However, because of simultaneously occuring chemical reactions, the molecular weight of polymer decreases and the structural integrity of the polyolefin membrane weakens. Further, due to the complexity of the processes involved, it is difficult to mass produce the polyolefin membranes having hydrophilic property.

Other methods for integrating hydrophilic property to the polyolefin membranes are further described by U.S. Pat. Nos. 4,346,142; 5,085,775; and 5,294,346. These methods use monomers of acrylic acid having hydrophilic property and polymers of polyethylene oxide by grafting them on to the surface of polymer membranes utilizing corona or plasma method. JP-A-8-31399 (unexamined published Japanese application) discloses a method of integrating both the hydrophilic and hydrophobic property to the polyolefin film surface by oxygen and carbon tetrafluoride gas utilizing plasma or sputter etching method. However, due to the plasma's unique properties characterized by having a wide range of energy distribution and a high degree of environmental susceptibility, it is difficult to obtain an uniformed porosity. Further, obtaining a polyolefin membrane having excellent physical properties is made difficult by the degradation of its mechanical property due to the damage to the surface of the film caused by the reactions accompanying the method.

SUMMARY OF THE INVENTION

In view of the foregoing, it is an object of the present invention to provide a method for producing a microporous membrane having hydrophilic/hydrophobic properties and pores with uniform size and shape by irradiating energized ion particles to a polymer film under vacuum.

It is another object of the present invention to provide a method for producing a microporous membrane having high-density of pores.

It is yet another object of the present invention to provide a simple process method for producing a microporous membrane having hydrophilic property.

It is further object of the present invention to provide a method for producing a microporous membrane having hydrophilic property and excellent physical characteristics.

It is further object of the present invention to provide a microporous membrane prepared by the method.

According to the above methods of the present invention, a microporous membrane having excellent physical characteristics can also be obtained by irradiating ion particles of the microporous membrane produced from conventional methods.

DETAILED DESCRIPTION OF THE INVENTION

The present invention will be described in detail below.

The present invention utilizes the principles for decreasing contact angle of hydrophilic solvents onto the surface of a polymer surface and increasing adhesion of the same by utilizing ion-beam irradiation.

Preparation of Precursor Film

A polymer film is obtained by using an extruder having a T-die or a tubular die, and is made from a polyolefin group consisting of polypropylene, high-density polyethylene, low-density polyethylene, and low-density linear polyethylene, because of cost and its low reactivity. Although an extrusion process can be carried out in a conventional extruding temperature, it is more preferable to carry out the process in temperature range of (polymer film melting point +10° C.)~(polymer melting point +100° C.). Extruding the polymer beyond this temperature range can lead to polymer degradation and consequently weaken its physical property.

The extruded polymer is drawn by using cast roll at 5~120 m/min in 10~150° C. to obtain a precursor film, at draw down ratio of 10~400 and the freezing temperature of 10~120° C.

Annealing

The precursor film is annealed at temperature range of (polymer film melting point −10° C.)~(polymer melting point −100° C.) for 10 sec. to 1 hour in order to obtain an elastic recovery over 40% at 25° C. This annealing process increases both the elastic recovery and crystallinity of the precursor polymer film. Annealing at a temperature higher than this range may melt the polymer film, and annealing at a temperature lower than the range restricts the polymer movement and any significant increase in both the elastic recovery and crstallinity is very marginal.

Irradiation

The annealed precursor film is placed in a vacuum chamber under $10^{-2}$~$10^{-8}$ torr, then both surfaces of the precursor film were irradiated with an ion-gun. The ion-gun was prepared by injecting a gas for generating energized ion particles to be used in irradiation by changing electrical current of ion-beam. Although, an irradiating distance from ion-gun to the surface of the precursor film of 5~100 cm is adequate, irradiating distance should be adjusted according to the vacuum pressure in the chamber. Such that, the irradiating distance should be 15~25 cm under a high vacuum of $10^{-2}$~$10^{31\ 3}$ torr, 25~55 cm under a high vacuum of $10^{-3}$~$10^{-6}$, and 55~60 cm under a very high vacuum of $10^{-6}$~$10^{-7}$. Any gas which has the capability of generating ion particles can be used by the ion-gun, however, electron, hydrogen, helium, oxygen, nitrogen, air, flourine, neon, argon, krypton, or $N_2O$ and their mixture compounds are also suitable for the purpose.

At this time, an energy level of the ion particles are set at $10^{-2}$~$10^{-7}$ KeV and an irradiating amount is set at $10^2$~$10^{20}$ ions/cm$^2$ by controlling a power supply device attached to the ion-gun. Irradiating ion particles with the above energy level and the amount, a microporous polymer film was obtained.

During or after irradiating with the ion-beam, a reactive gas in the amount of 0.5–20 ml/min can be applied to the polymer film for determining hydrophilic or hydrophobic property of the polymer film, according to a type of reactive gas applied. For providing a polymer film having hydrophilic property, it is preferable to use helium, hydrogen, oxygen, nitrogen, air, $N_2O$, ammonia, carbon monoxide, carbon dioxide, or methane or their mixture compound; and to provide a polymer film having hydrophobic property, it is preferable to use flourine, carbon tetraflouride or their mixture compound. This process of determining hydrophilic or hydrophobic property of the polymer film can also be carried out after a final microporous membrane has been obtained.

Cold Stretching

The microporous polymer film obtained from the above irradiation process is subjected to a stretching process utilizing rolls or a biaxial stretcher by mono or biaxial stretching to increase the size of micro-pores formed in the polymer film. Here, the stretching is conducted at a temperature ranging from −20° C. to (polymer melting point −40° C.).

Hot Stretching

The microporous polymer film stretched from the cold stretching process was subjected to a further stretching process utilizing a roll or a biaxial stretcher by mono or biaxial stretching for obtaining micro-pores of desired size having mechanical property. Here, the stretching is conducted at a temperature of from (polymer melting point −40° C.) to (polymer melting point −5° C.).

Heat Setting

The microporous film, hot stretched in a temperature below polymer melting point, having tension was then subjected to a heat setting under a tensioned state for maintaining the integrity of its stretched pores. Here, the heat setting is conducted at a temperature ranging from (polymer melting point −80° C.) to (polymer melting point −5° C.).

A microporous membrane produced by the above methods of the present invention having a circular or an elliptical shape and a pore size of 0.005~10 μm is suitable as a separator for lithium ion batteries. Additionally, a laminate membrane, produced by laminating a first microporous membrane produced by the methods of the present invention with a second microporous membrane produced by the conventional methods wherein the irradiating step has not been utilized, is also suitable as a separator for a lithium battery.

The above process of the present invention describes and provides a method for manufacturing a microporous membrane having excellent physical properties. The steps of the process can be deleted, changed or modified for providing a microporous membrane with a different or a desired property.

Herein below the preferred examples and comparative examples will be described in detail.

EXAMPLE 1

A Polyethylene Microporous Membrane Obtained by Utilizing Ion-beam Irradiation

A high-density precursor polyethylene film to a polyethylene microporous membrane was obtained by utilizing polyethylene having a high-density of 0.964 g/cc and a melt index of 0.3 g/10 min, a single screw extruder having a T-die, and a take-up device. In this process, an extruding temperature was set at 180° C., temperature of the take-up device's roll was set at 110° C., and a draw speed was set at 35 m/min at a draw down ratio of 70. The precursor film was annealed in a dry oven at 110° C. for 1 hour. The annealed precursor film was put in a vacuum chamber under $10^{-5}$~$10^{-6}$ torr. Then, the precursor film was irradiated on both surfaces by an ion-gun with energized argon particles to form micro-pores, and a polyethylene microporous membrane was obtained. Here, energy of ion-beam was set at 3 KeV, and irradiating ion particle amount was set at $10^{18}$ ions/cm$^2$.

EXAMPLE 2

A Polyethylene Microporous Membrane Obtained by Utilizing Ion-beam Irradiation and Cold Stretching A precursor polymer film to a polyethylene microporous membrane was obtained by the process described in Example 1, except the draw speed was set at 30 m/min and draw ration was set at 60. Then, the extruded precursor polymer film was annealed and irradiated as in Example 1, except the energy of the ion-beam was changed to 1.5 KeV, and the irradiating ion particle amount was changed to $10^{17}$ ions/cm$^2$. The precursor film with micro-pores was then cold stretched in a machinery direction (MD) at room temperature, to obtain a film with 150% of the length of the respective film of Example 1 (herein after referred to as stretch ratio). Then, the stretched film was heat set under a tensioned state using rolls at 115° C. for 2 minutes and cooled for obtaining a polyetheylene microporous membrane.

EXAMPLE 3

A Polyethylene Microporous Membrane Obtained by Utilizing Ion-beam Irradiation and Hot Stretching A polyethylene microporous membrane was obtained by the process described in Example 2, except the energy of the ion-beam was changed to 2 KeV, the irradiating ion particle amount was changed to $5\times10^{17}$ ions/cm$^2$, and the stretching temperature was changed to 115° C.

EXAMPLE 4

A Polyethylene Microporous Membrane Obtained by Utilizing Ion-beam Irradiation and Both Cold and Hot Stretching A polyethylene microporous membrane was obtained by the process described in Example 2 except; a cold stretch method was carried out at a stretch ratio of 50% in room temperature; followed by a hot stretching method was conducted at temperature of 115° C. and a stretch ratio of 100%; the energy of ion-beam was changed to 1.5 KeV; and the irradiating ion particle amount was changed to $2\times10^{17}$ ions/cm$^2$.

EXAMPLE 5

Obtaining a Polypropylene Microporous Membrane

A precursor polypropylene film to a polypropylene microporous membrane was obtained by a process described in Example 1. Here, polypropylene of isotactic homopolymer having a density of 0.90 g/cc and a melt index of 2.0 g/10 min was used. For this process, the extruding temperature was set at 230° C., temperature of the take-up device's roll was set at 90° C., the draw speed was set at 40 m/min at draw down ratio of 80. The precursor film was then annealed in a dry oven of Example 1 at 140° C. for 1 hour. The annealed precursor film was irradiated on both surfaces, under vacuum, by an ion-gun with argon particles to form micro-pores as described by Example 1. Here, the energy of ion-beam was set at 1.5 KeV, and irradiating ion particle amount was set at $5\times10^{17}$ ions/cm$^2$. After irradiation, as described for Example 4, a cold stretching was conducted at room temperature at a stretch ratio of 30%, followed by a hot stretch method under 140° C. at a stretch ratio of 120%. Then, the stretched film was heat set at 140° C. for 2 minutes and cooled to obtain a polypropylene microporous membrane.

EXAMPLE 6

A Microporous Membrane Manufactured from Polypropylene/polyethylene Blend

A precursor polymer film was prepared from polypropylene and high-density polyethylene blend by the processes described in Examples 4 and 5 utilizing the T-die and take-up device. The composition ratio of polypropylene/polyethylene was 70/30 by weight. In this process, the extruding temperature was set at 230° C., temperature of the take-up device's roll was set at 85° C., and the draw speed was set at 40 m/min at draw down ratio of 80. The obtained precursor polymer film was placed in the dry oven of Example 1 at 120° C. for 1 hour to be annealed. Then the precursor polymer film was irradiated under the same conditions of Example 1, and obtained micro-pores on the surface of the precursor polymer film. Here, the ion-beam energy was set at 1.5 KeV and the irradiating ion particle amount was set at $2.5\times10^{17}$ ions/cm$^2$. After irradiation, as described in Example 4, a cold stretching was conducted in room temperature at a stretch ratio of 30%, followed by a hot stretch method under 125° C. at a stretch ratio of 120%. Then, the stretched film was heat set at 125° C. for 2 minutes and cooled to obtain a polypropylene/polyethylene microporous membrane.

EXAMPLE 7

A Microporous Membrane Manufactured from Laminated Polypropylene/polyethylene

A high-density polyethylene precursor film and a polypropylene precursor film, each having thickness of 10 µm, were obtained by the process described in Examples 4 and 5, respectively. The precursor films were pressed in polypropylene/high-density polyethylene/polypropylene ordered layers at 130° C. under a pressure of 50 kg/cm$^2$. The laminate film was irradiated under the same conditions and by the process described for Example 6, and micro-pores were formed on the laminate film. Then, the laminate film with micro-pores was subjected to cold and hot stretching processes, a heat setting process, and cooled as described in Example 6 to obtain a microporous membrane.

EXAMPLE 8

A Polyethylene Microporous Membrane Obtained by Utilizing Ion-beam Irradiation and Cold/hot (biaxial) Stretching A high-density polyethylene precursor film, obtained by the process as described in Example 4, was annealed. After annealing, micro-pores were formed on the surface of the precursor film by irradiating under the same conditions and by the process described in Example 4. Then, the precursor film was subjected to a cold stretch as described in Example 4, followed by a biaxial hot stretch process by utilizing a biaxial stretching device (manufactured by Toyoseiki Co. of Japan) at 115° C. Here, each stretch rotation X and Y, respectively, were set at a stretch ratio of 100%. The film stretched at 115° C. was then heat set for 2 minutes to obtain a polyethylene microporous membrane.

EXAMPLE 9

A Polyethylene Microporous Membrane Obtained by Hot Stretching, Ion-beam Irradiation, and Cold/hot (biaxial) Stretching Methods A high-density precursor polyethylene film obtained from the process described in Example 4 was subjected to a biaxial hot stretch process by utilizing a Toyoseiki biaxial stretching device at 115° C. Here, each stretch rotation X and Y, respectively, were set at a stretch ratio of 100%. The precursor film was annealed and then irradiated in the same condition and by the process as described in Example 4 respectively, to form micro-pores on the surface of the precursor polyethylene film. After irradiation, the precursor film was cold and hot stretched, heat set, and cooled by the process as described in the Example 8 to obtain a resulting polyethylene microporous membrane.

EXAMPLE 10

A Polyethylene Microporous Membrane Having Hydrophilic Property Obtained by Utilizing Ion-beam Irradiation, Stretching A high-density precursor polyethylene film obtained by the process described in Examples 4 was annealed. After annealing process, the precursor polymer film was irradiated under the same conditions of Example 4. During irradiation, the surface of the precursor polymer film was treated with 4 ml/min of hydrophilic inducing reactive gas (oxygen) by utilizing gas injector device. Here, the ion-beam energy was set at 1.0 KeV and the irradiating ion particle amount was set at $5 \times 10^{16}$ ions/cm$^2$. After irradiation, as described by Example 4, a cold stretching was conducted at room temperature, followed by a hot stretching at 115° C. Then, the precursor film stretched at 115° C. was heat set for 2 minutes and cooled for obtaining a polyethylene microporous membrane having hydrophilic property.

EXAMPLE 11

A Polyethylene Microporous Membrane Obtained by Utilizing Ion-beam Irradiation, Stretching A high-density precursor polyethylene film obtained by the process described in Examples 10 was annealed. After annealing process, the precursor polymeric film was irradiated under the same conditions of Example 10 to form micro pores on the surface of the precursor film. During irradiation, the surface of the precursor polymer film was treated with 4 ml/min of hydrophilic inducing reactive gas (oxygen) by utilizing gas injector device. Then, under the same irradiating conditions, the other surface of the precursor polymer film was treated with 4 ml/min of hydrophobic inducing reactive gas (flourine). After irradiation, stretching methods were conducted as described by Example 10. Then, the precursor film stretched at 115° C. was heat set for 2 minutes and cooled for obtaining a polyethylene microporous membrane.

EXAMPLE 12

Increasing Hydrophilic Property of a Polyethylene Microporous Membrane Obtained from Dry Process by Utilizing Ion-beam Irradiation and Hydrophilic Inducing Reactive Gas A high-density precursor polyethylene film obtained by the processes described in Examples 4 was annealed. After annealing process, micro-pores were formed on the surface of the precursor polymer film by a conventional cold stretching method in room temperature. It was then subjected to a hot stretching at 115° C., followed by heat setting. Here, the stretching were conducted by the process as described in Example 4, where the cold stretching and hot stretching were carried out at stretch ratios of 50% and 100%, respectively. Then, the precursor polyethylene film was irradiated with ion particles and simultaneously treated with hydrophilic inducing reactive gas (oxygen) by the processes described in Example 10. Here, the ion-beam energy was set at 1.0 KeV, the irradiating ion particle amount was $10^{16}$ ions/cm$^2$, and the reactive gas (oxygen) amount was 4 ml/min.

EXAMPLE 13

Increasing Hydrophilic Property of a Polyethylene Microporous Membrane Obtained from Wet Process by Utilizing Ion-beam Irradiation and Hydrophilic Inducing Reactive Gas A precursor polyethylene film was obtained by utilizing the same high-density polyethylene of Example 1, ultra high molecular weight polyethylene (UHMWPE, Mw of 2,500,000), and liquid paraffin by a conventional wet process. The composition ratio of high-density polyethylene:UHMWPE:liquid paraffin was set at 2:13:85 by weight. As described in Example 1, utilizing the T-die attached to the single screw extruder, the precursor film was obtained. In this process, the extruding temperature was set at 180° C., temperature of the take-up device's roll was set at 30° C., and the draw speed was set at 5 m/min at draw down ratio of 10. The precursor film was then subjected to a biaxial hot stretch process by utilizing Toyoseiki biaxial stretching device at 115° C. Here, each stretch rotation X and Y, respectively, were set at a stretch ratio of 100%. After stretching, liquid paraffin residue was removed from the polyethylene film by methylene chloride or by compounds of hydrocarbons and chloride. Then, the polyethylene film was rinsed with water and dried. The resulting polyethylene film was irradiated with ion particles and simultaneously treated with hydrophilic inducing oxygen gas by the process described in Example 12.

Comparative Example 1

A Polyethylene Microporous Membrane Obtained from a Conventional Dry Process

A polyethylene microporous membrane was obtained by the process described in Example 12 without the steps of irradiating with ion particles and treating with reactive gas.

Comparative Example 2

A Polyethylene Microporous Membrane Obtained by Corona Discharge

A polyethylene microporous membrane was obtained by the process described in Example 4, except the surface of a precursor polyethylene film was additionally subjected to corona discharge process by utilizing variable Tesla transitional coil at 12,000 Volts and at a rate of 1 in$^2$ of the film surface per 3 to 5 seconds.

Comparative Example 3

A Polyethylene Microporous Membrane Obtained by a Conventional Wet Process

A polyethylene microporous membrane was obtained by the process described in Example 13 without the steps of irradiating with ion particles and treating with reactive gas.

Comparative Example 4

Increasing Hydrophilic Property of a Polyethylene Microporous Membrane by Plasma Treatment The surface of a polyethylene microporous membrane obtained by the dry process of Comparative Example 1 was subjected to a plasma treatment at irradiating energy of 0.8 W/cm$^2$ and a pressure of 1 torr, in 30 seconds to obtain a microporous membrane with hydrophilic property.

From the above Examples 1 to 13 and Comparative Examples 1 to 4, membrane thickness, pore size, pore density, puncture strength, shut-down temperature, and melt-integrity values of microporous membranes were obtained, and they are represented in Tables 1 to 3. In addition, air permeability, porosity, tensile strength, and tensile modulus of microporous membranes were also obtained from the above Examples 1 to 13 and Comparative Examples 1 to 4, and they are also represented in Tables 1 to 3. Further, water absorption rates of microporous membranes obtained from the above Examples 10 to 13 and Comparative Example 4 are represented in Table 3. Machinery direction (MD) indicated in Tables 1 to 3 represents a stretching direction and transverse direction (TD) represents perpendicular direction of the stretching direction, in the present invention.

TABLE 1

|  | Example 1 | Example 2 | Example 3 | Example 4 | Example 5 | Example 6 |
|---|---|---|---|---|---|---|
| Thickness [μm] | 23 | 24 | 24 | 24 | 25 | 25 |
| Pore size [μm] | 0.02 × 0.02 | 0.15 × 0.06 | 0.06 × 0.03 | 0.12 × 0.05 | 0.08 × 0.03 | 0.10 × 0.05 |
| Porosity [%] | 28 | 37 | 38 | 40 | 48 | 42 |
| Pore density [pores/cm$^2$] | $18 \times 10^9$ | $14 \times 10^9$ | $14 \times 10^9$ | $15 \times 10^9$ | $16 \times 10^9$ | $15 \times 10^9$ |
| Air permeability [sec/100 cc] | 1270 | 980 | 1040 | 850 | 610 | 725 |
| Puncture Strength [g] | 380 | 304 | 340 | 295 | 510 | 470 |
| Tensile strength (MD/TD) [kg/cm$^2$] | 1250/160 | 1300/165 | 1450/180 | 1410/200 | 1580/190 | 1530/180 |
| Tensile modulus (MD/TD) [kg/cm$^2$] | 6500/3400 | 6620/3440 | 6800/3480 | 6850/3490 | 7200/3680 | 7000/3610 |
| Shut-down Temperature (° C.) | 126 | 128 | 127 | 128 | 161 | 130 |
| Melt-integrity Temperature (° C.) | 135 | 134 | 135 | 135 | 167 | 167 |

TABLE 2

|  | Example 7 | Example 8 | Example 9 | Comparative Example 1 | Comparative Example 2 | Comparative Example 3 |
|---|---|---|---|---|---|---|
| Thickness [μm] | 26 | 24 | 24 | 25 | 25 | 25 |
| Pore size [μm] | 0.08 × 0.03 | 0.12 × 0.10 | 0.08 × 0.07 | 0.13 × 0.06 | 7 × 4 | 0.1 × 0.1 |
| Porosity [%] | 45 | 42 | 41 | 37 | 50 | 36 |
| Pore density [pores/cm$^2$] | $16 \times 10^9$ | $15 \times 10^9$ | $15 \times 10^9$ | $6 \times 10^9$ | $1 \times 10^9$ | $5 \times 10^9$ |
| Air permeabilit [sec/100 cc] | 690 | 625 | 650 | 960 | 18 | 670 |
| Puncture Strength [g] | 520 | 335 | 364 | 260 | 95 | 440 |
| Tensile strengt (MD/TD) [kg/cm$^2$] | 1590/200 | 1900/1300 | 2050/1500 | 1350/150 | 7000/50 | 1400/850 |
| Tensile modulus (MD/TD) [kg/cm$^2$] | 7100/3670 | 6900/5980 | 7500/6120 | 6700/3470 | 5200/2740 | 6400/5630 |
| Shut-down Temperature (° C.) | 127 | 129 | 129 | 131 | 132 | 129 |
| Melt-integrity Temperature (° C.) | 167 | 133 | 134 | 133 | 133 | 138 |

As can be seen from the above Tables 1 and 2, the microporous membranes obtained by the process described in Examples 1 to 9 have more uniform pore sizes and higher pore density and the other physical properties than the microporous membranes obtained by the process described in Comparative Examples 1 to 3.

TABLE 3

|  | Example 10 | Example 11 | Example 12 | Example 13 | Comparative Example 4 |
|---|---|---|---|---|---|
| Thickness [μm] | 23 | 24 | 24 | 24 | 25 |
| Pore size [μm] | 0.02 × 0.02 | 0.15 × 0.06 | 0.06 × 0.03 | 0.12 × 0.05 | 0.08 × 0.03 |
| Porosity [%] | 28 | 37 | 38 | 40 | 48 |

TABLE 3-continued

|  | Example 10 | Example 11 | Example 12 | Example 13 | Comparative Example 4 |
| --- | --- | --- | --- | --- | --- |
| Pore density [pores/cm$^2$] | 18 × 10$^9$ | 14 × 10$^9$ | 14 × 10$^9$ | 15 × 10$^9$ | 16 × 10$^9$ |
| Air permeability [sec/100 cc] | 840 | 825 | 920 | 650 | 860 |
| Puncture Strength [g] | 290 | 283 | 287 | 428 | 230 |
| Tensile strength (MD/TD) [kg/cm$^2$] | 1250/160 | 1300/165 | 1450/180 | 1410/200 | 1580/190 |
| Tensile modulus (MD/TD) [kg/cm$^2$] | 6500/3400 | 6620/3440 | 6800/3480 | 6850/3490 | 7200/3680 |
| Shut-down Temperature (° C.) | 128 | 128 | 131 | 128 | 131 |
| Melt-integrity Temperature (° C.) | 134 | 134 | 133 | 138 | 133 |
| Water absorption Speed [sec] | 2.2 | 2.3 | 2.6 | 2.5 | 5.3 |

As it can be seen from the above Table 3, the microporous membranes obtained by the process described in Examples 10 to 13 have faster water absorption speed, higher hydrophilic property, and better physical properties than the microporous membranes obtained by the process described in Comparative Examples 4.

According to the methods described in the examples of the present invention a microporous membrane having an uniformed pore size and a high pore density can be achieved by utilizing an ion-beam irradiation. Additionally, according to the methods disclosed by the present invention, a microporous membrane having a superior hydrophilc and physical properties can also be obtained.

Further, according to the methods of the present invention a high draw down ratio, a high elastic recovery, and a high crystallinity may not be considered as important requirements while overcoming drawbacks of conventional methods.

In this disclosure, there is shown and described only the preferred examples of the invention, but, as aforementioned, it is to be understood that the invention is capable of use in various other combinations and environments and is capable of changes or modifications within the scope of the inventive concepts as expressed herein.

What is claimed is:

1. A method of producing a microporous membrane, wherein the method comprises irradiating a polymer film with energized ion-particles under vacuum to form the microporous membrane, wherein the polymer film is extruded at a temperature ranging from polymer melting point +10° C. to polymer melting point +100° C., and the extruded polymer film is drawn at a rate of 5–120° C. m/min in 10–150° C.

2. The method of producing a microporous membrane according to claim 1, wherein the polymer film is irradiated on one or both surfaces.

3. The method of producing a microporous membrane according to claim 1, wherein the energized ion-particles are selected from the group consisting of electron, hydrogen, helium, oxygen, nitrogen, air, fluorine, neon, argon, krypton, N$_2$O and a mixture compound thereof.

4. The method of producing a microporous membrane according to claim 1, wherein the irradiation is conducted under vacuum of 10$^{-2}$~10$^{-8}$ torr at an irradiating distance of 5~100 cm.

5. The method of producing a microporous membrane according to claim 1, wherein the ion-particles have an energy of 10$^{-2}$~10$^7$ KeV.

6. The method of producing a microporous membrane according to claim 1, wherein the irradiation is conducted with an energized ion-particles amount of 10$^2$~10$^{20}$ ions/cm$^2$.

7. The method of producing a microporous membrane according to claim 1, wherein the polymer film is subjected to an annealing process before and/or after being irradiated.

8. The method of producing a microporous membrane according to claim 7, wherein the annealing process is conducted at a temperature of from (polymer melting point −100° C.) to (polymer melting point −5° C.) for 10 seconds to 1 hour.

9. The method of producing a microporous membrane according to claim 1, wherein the polymer film is subjected to an stretching process before and or after the irradiating process.

10. The method of producing a microporous membrane according to claim 9, wherein the stretching process is conducted at a temperature of from −20° C. to (polymer melting point −40° C.).

11. The method of producing a microporous membrane according to claim 9, wherein the stretching process is conducted at a temperature of from (polymer melting point −40° C.) to (polymer melting point −5° C.).

12. The method of producing a microporous membrane according to claim 1, wherein the polymer film is subjected to a heat setting process before and or after the irradiating process.

13. The method of producing a microporous membrane according to claim 12, wherein the heat setting process is conducted at a temperature of from (polymer melting point −80° C.) to (polymer melting point −5° C.).

14. The method of producing a microporous membrane according to claim 1, wherein during the irradiation process, a reactive gas is simultaneously applied to the surface of the polymer film.

15. The method of producing a microporous membrane according to claim 14, wherein the reactive gas is selected from the group consisting of helium, hydrogen, oxygen, nitrogen, air, ammonia, carbon monoxide, carbon dioxide, methane, fluorine, carbon tetrafluoride, N$_2$O and a mixture compound thereof.

16. The method of producing a microporous membrane according to claim 14, wherein the reactive gas is applied at an amount of 0.5~20 ml/min.

17. The method of producing a microporous membrane according to claim 1, wherein after the completion of the irradiation process, a reactive gas is applied to the surface of the polymer film.

18. The method of producing a microporous membrane according to claim 17, wherein the reactive gas is selected from the group consisting of helium, hydrogen, oxygen, nitrogen, air, ammonia, carbon monoxide, carbon dioxide, methane, fluorine, carbon tetrafluoride, $N_2O$ and a mixture compound thereof.

19. The method of producing a microporous membrane according to claim 17, wherein the reactive gas is applied at an amount of 0.5~20 ml/min.

20. The method of producing a microporous membrane according to claim 17, wherein the polymer film is a polyolefin selected from the group consisting of polypropylene, high-density polyethylene, low-density polyethylene, low-density linear polyethylene and a mixture thereof.

21. A method of producing a microporous membrane having improved physical properties wherein the method comprises irradiating a microporous membrane with energized ion-particles under vacuum to form the microporous membrane having improved physical properties.

22. A method of producing a microporous membrane having improved physical properties wherein the method comprises injecting a reactive gas while irradiating a microporous membrane with energized ion-particles under vacuum to form the microporous membrane having improved physical properties.

23. A method of producing a microporous membrane comprising the steps of:

a) extruding a polymer at a temperature ranging from polymer melting point +10° C. to polymer melting point +100° C.;

b) drawing the extruded polymer at a rate of 5–120 m/min in 10–150° C. to obtain a polymer film;

c) annealing the polymer film at a temperature ranging from polymer melting point −100° C. to polymer melting point −5° C. for 10 seconds to 1 hour;

d) irradiating both surfaces of the annealed polymer film with an ion-particle amount of $10^2$–$10^{20}$ ion/cm$^2$ energized at $10^{-2}$–$10^7$ KeV, at an irradiating distance of 5–100 cm under a vacuum of $10^{-2}$–$10^{-8}$ torr;

e) cold stretching the irradiated polymer film at a temperature ranging from −20° C. to polymer melting point −40° C.;

f) hot stretching the cold stretched polymer film at a temperature ranging from polymer melting point −40° C. to polymer melting point −5° C.; and g) heat setting the hot stretched polymer film at a temperature ranging from polymer melting point −80° C. to polymer melting point −5° C. to form the microporous membrane.

24. A method of producing a microporous membrane comprising the steps of:

a) extruding a polymer at a temperature ranging from polymer melting point +10° C. to polymer melting point +100° C.;

b) drawing the extruded polymer at a rate of 5–120 m/min in 10–150° C. to obtain a polymer film;

c) annealing the polymer film at a temperature ranging from polymer melting point −100° C. to polymer melting point −5° C. for 10 seconds to 1 hour;

d) irradiating both surfaces of the annealed polymer film with an ion-particle amount of $10^2$–$10^{20}$ ion/cm$^2$ energized at $10^{-2}$–$10^7$ KeV, at an irradiating distance of 5–100 cm under a vacuum of $10^{-2}$–$10^{-8}$ torr;

e) cold stretching the irradiated polymer film at a temperature ranging from −20° C. to polymer melting point −40° C.;

f) hot stretching the cold stretched polymer film at a temperature ranging from polymer melting point −40° C. to polymer melting point −5° C.; and g) heat setting the hot stretched polymer film at a temperature ranging from polymer melting point −80° C. to polymer melting point −5° C. to form the microporous membrane, wherein the polymer film is a polyolefin selected from the group consisting of polypropylene, high-density polyethylene, low-density polyethylene, and low-density linear polyethylene.

* * * * *

UNITED STATES PATENT AND TRADEMARK OFFICE
CERTIFICATE OF CORRECTION

PATENT NO.    : 6,540,953 B1
DATED         : April 1, 2003
INVENTOR(S)   : Lee et al.

It is certified that error appears in the above-identified patent and that said Letters Patent is hereby corrected as shown below:

Title page,
Item [57], ABSTRACT,
Line 10, "KeV," should read -- keV, --
Line 11, "~10⁻" should read -- ~$10^{-5}$ --
Line 12, "[torr;" should read -- torr; --

Column 1,
Line 67, "membanes" should read -- membranes --
Line 67, "Celenese" should read -- Celanese --

Column 2,
Line 4, "hydrophillic" should read -- hydrophilic --
Line 6, "occuring" should read -- occurring --
Line 39, "high-density of" should read -- high density of --

Column 3,
Line 22, "crstallinity" should read -- crystallinity --
Line 33, "chamber. Such that, the" should read -- chamber such that the --
Line 35, "$10^{-2}$~$10^{31\ 3}$" should read -- $10^{-2}$~$10^{-3}$ --
Line 38, "ion-gun," should read -- ion-gun; --
Line 43, "KeV" should read -- keV --
Line 57, "flourine" should read -- fluorine --; and "tetraflouride" should read -- tetrafluoride --

Column 4,
Lines 54 and 67, "KeV," should read -- keV, --

Column 5,
Line 8, "polyetheylene" should read -- polyethylene --
Line 18, "KeV," should read -- keV, --
Line 28, "except;" should read -- except: --
Line 32, "KeV;" should read -- keV, --
Line 50, "KeV;" should read -- keV; --

Column 6,
Line 8, "KeV," should read -- keV, --

UNITED STATES PATENT AND TRADEMARK OFFICE
CERTIFICATE OF CORRECTION

PATENT NO.    : 6,540,953 B1
DATED         : April 1, 2003
INVENTOR(S)   : Lee et al.

It is certified that error appears in the above-identified patent and that said Letters Patent is hereby corrected as shown below:

Column 7,
Line 7, "Examples" should read -- Example --
Line 12, "KeV" should read -- keV --
Line 24, "Examples" should read -- Example --
Line 33, "(flourine)." should read -- (fluorine). --
Lne 45, "Examples" should read -- Example --

Column 10,
Table 2, "permeabilit" should read -- permeability --; and "strengt" should read -- strength --

Column 11,
Line 34, "hydrophilc" should read -- hydrophilic --
Line 52, "5–120°C. m/min" should read -- 5–120 m/min --
Line 67, "KeV." should read -- keV. --

Column 12,
Lines 37 and 48, "and or" should read -- and/or --

Column 13,
Line 18, "properties wherein" should read -- properties, wherein --
Line 23, "properties wherein" should read -- properties, wherein --
Line 40, "KeV," should read -- keV, --

Column 14,
Line 24, "KeV," should read -- keV, --

Signed and Sealed this

Thirtieth Day of September, 2003

JAMES E. ROGAN
*Director of the United States Patent and Trademark Office*